United States Patent
Erixon

(10) Patent No.: US 6,912,108 B2
(45) Date of Patent: Jun. 28, 2005

(54) PROTECTIVE EQUIPMENT FOR A SERIES-CAPACITOR INSTALLATION

(75) Inventor: Mats Erixon, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/433,324

(22) PCT Filed: Nov. 30, 2001

(86) PCT No.: PCT/SE01/02658

§ 371 (c)(1),
(2), (4) Date: Oct. 7, 2003

(87) PCT Pub. No.: WO02/45231

PCT Pub. Date: Jun. 6, 2002

(65) Prior Publication Data

US 2004/0057168 A1 Mar. 25, 2004

(30) Foreign Application Priority Data

Dec. 1, 2000 (SE) .............................................. 0004428

(51) Int. Cl.$^7$ ................................................ H02H 7/16
(52) U.S. Cl. ........................................................ 361/16
(58) Field of Search .............................. 361/15, 16, 45, 361/17; 324/117, 522; 323/350

(56) References Cited

U.S. PATENT DOCUMENTS

| | | | |
|---|---|---|---|
| 2,584,710 A | | 2/1952 | Johnson |
| 2,928,995 A | | 3/1960 | Hjertberg |
| 2,949,567 A | | 8/1960 | Johnson |
| 3,457,459 A | | 7/1969 | Wolf |
| 3,707,650 A | * | 12/1972 | Innis et al. ..................... 361/16 |
| 3,909,672 A | * | 9/1975 | Lundquist et al. ............. 361/17 |
| 3,984,734 A | * | 10/1976 | Becker .......................... 361/17 |
| 4,219,856 A | * | 8/1980 | Danfors et al. ................ 361/15 |
| 4,322,766 A | * | 3/1982 | Becker et al. ................. 361/17 |
| 5,325,259 A | * | 6/1994 | Paulsson ..................... 361/128 |
| 5,392,184 A | * | 2/1995 | Unterlass et al. .............. 361/16 |
| 5,475,272 A | * | 12/1995 | Gothelf ....................... 307/109 |
| 6,211,684 B1 | * | 4/2001 | McKee et al. ............... 324/548 |

* cited by examiner

*Primary Examiner*—Brian Sircus
*Assistant Examiner*—Boris Benenson
(74) *Attorney, Agent, or Firm*—Venable LLP; Eric J. Franklin

(57) ABSTRACT

A series-capacitor installation intended to be placed on a platform, insulated towards ground, for connection into a power line (L) for carrying a line current (IL) has a first and a second capacitor group (C1 and C2, respectively). The capacitor groups are mutually parallel-connected and a non-linear voltage-limiting resistor (Z) is connected in parallel with the capacitor groups, the first capacitor group for carrying a first capacitor current (IC1) and the second capacitor group for carrying a second capacitor current (IC2). Protective equipment is intended, in dependence on currents sensed in the installation and on chosen criteria for evaluation thereof, to initiate a protective measure for the installation under an abnormal operating condition. The protective equipment comprises means (T1 and T2, T3, 9, respectively) for forming a first measured value (IMD) representing the difference between the first and second capacitor currents, and means (4, 5, 6) which, in dependence on said first measured value, initiate a protective measure for the installation for each of the abnormal operating conditions unbalance current between the first and second capacitor currents, overcurrent (IZ) through the voltage-limiting resistor, and a short-circuit fault in the series-capacitor installation.

20 Claims, 3 Drawing Sheets

Fig. 1

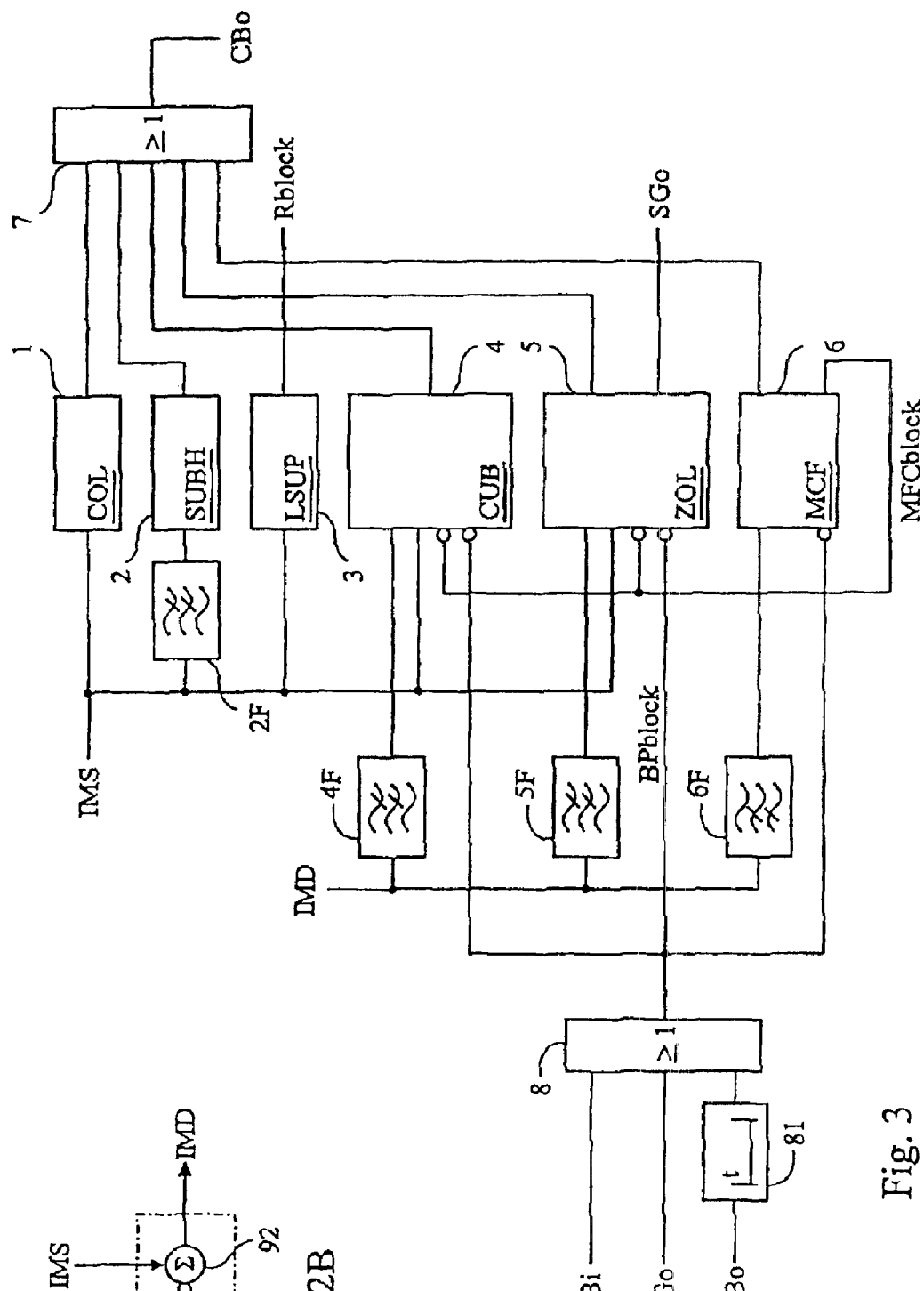

PROTECTIVE EQUIPMENT FOR A SERIES-CAPACITOR INSTALLATION

TECHNICAL FIELD

The present invention relates to protective equipment for a series capacitor installation, a method for detecting abnormal operating conditions in a series capacitor installation, and a current-measuring device for forming a measured value representing a difference current in a series capacitor installation.

The series capacitor installation is intended to be placed on a platform, insulated towards ground, for connection to a power line for carrying a line current, with a first and a second capacitor group, mutually parallel-connected and with a non-linear voltage-limiting resistor connected in parallel with the capacitor groups, the first capacitor group for carrying a first capacitor current and the second capacitor group for carrying a second capacitor current. The protective equipment is intended, in dependence on currents sensed in the installation and on chosen criteria for evaluation thereof, to initiate a protective measure for the installation under at least one of the abnormal operating conditions unbalance current between the first and second capacitor currents, overcurrent through the voltage-limiting resistor, and a short-circuit fault in the series capacitor installation.

BACKGROUND ART

Series capacitor installations are used to increase the transmission capability of power lines for transmission of electric power and for stabilizing the operation of such power lines, especially in the case of long high-voltage transmission lines. For high system voltages, typically exceeding 145 kV, the components included in the installation are usually arranged on a platform insulated towards ground potential.

A known design of such a series capacitor installation and, in particular, protective equipment for such an installation is described in IEEE Transactions on Power Delivery, Vol. 4, No. 2, April 1989, pages 1369–1376: EHV Series Capacitor Banks, a new approach to platform to ground signalling, relay protection and supervision (M Adolfsson et al).

The protective equipment comprises a number of relay protection devices to which measured values of currents sensed in the installation are supplied and which, in dependence on these measured values and on criteria chosen and set in the relay protection devices for evaluation of the measured values, initiate protective measures in the event that these measured values indicate an abnormal operating condition for the installation. The relay protection devices are placed in a control room at ground potential.

The series capacitor is normally designed comprising a number of capacitor units. As is clear from FIG. 3.1 in the cited document, the capacitor units are divided into two parallel-connected capacitor groups, whereby each one of these groups is built up of a plurality of capacitor units.

In addition thereto, the installation comprises a non-linear voltage-limiting resistor, connected in parallel with the series capacitor, in the form of a varistor, a bypass breaker and a spark gap capable of being fired, the last two components being connected in parallel with the series capacitor via a damping inductor D.

A current transformer senses the current that flows through the series capacitor up to the point where this is connected in parallel with the varistor, and a measured value of this current is supplied to a relay protection device of inverse-time type to protect the series capacitor against thermal overload. In this case, the criterion is the current/inverse-time characteristic of the relay protection device.

Another current transformer senses the current which flows through the series capacitor installation out into the power line, that is, the line current, and a measured value of this current is supplied to a relay protection device for detecting subsynchronous oscillations in the current flowing through the power line. Here the criterion is the presence of oscillations in the line current of a frequency considerably lower than the system frequency of the power line.

Another current transformer is connected in a bridge connection between series-connected parts of the two capacitor groups for monitoring their mode of operation. A measured value of current sensed by this current transformer is supplied to a relay protection device for detecting unbalance in the series capacitor, caused, for example, by the triggering of an internal fuse in the capacitor units. In this case, the criterion is a current of a certain level through the current transformer, usually put in relation to the actual line current such that the criterion consists of a quotient between these currents.

The components included in the installation are placed on insulators on the platform, whereby one side of the above-described parallel connection of the components, in FIG. 3.1 in the cited document the right one, is galvanically connected to the platform. For example, a flashover across an insulator causes a current to flow through this connection. A current transformer senses this current and a measured value thereof is supplied to a relay protection device for detecting flashover against the platform. The criterion is here a chosen current level.

A further current transformer senses a current flowing through the spark gap and a measured value thereof is supplied to the relay protection device for detecting any remaining current through the spark gap. In this case, the criterion is a chosen current level that remains for a chosen period of time.

In all of the above-mentioned cases, the respective relay protection device initiates, as protective measure, a closing of the bypass breaker by generating an order signal therefor.

An additional current transformer senses a current flowing through the varistor and a measured value of this current is supplied to a relay protection device for the combined protection of the varistor against overcurrent and against thermal overload. Here the criteria are both a current level and a calculated thermal heating of the varistor. The relay protection device initiates, as protective measure, firing of the spark gap as well as closing of the bypass breaker.

The above-mentioned criteria in some cases also include chosen time delays and the protective measures also include, depending on which relay protection device initiates these, such measures as temporary or definite blocking of the by-pass breaker, automatic reclosing of the installation through reopening of the bypass breaker, etc. Further details about the performance of these protective functions, however, fall outside the scope of this patent application. They are known per se to the person skilled in this technical field and are described in greater detail also in the article referred to here.

In the same article, a so-called optical current transformer suited for the purposes described above, is also described. The current transformer has a magnetic core surrounding a connection bar, which bar is intended to be connected in the conductor whose current is to be measured. Further, the current transformer comprises, in a known manner, a secondary winding with a burden as well as an optoelectric converter for conversion of the voltage, formed across the burden, into an optical signal corresponding to the amplitude of the voltage. The optical signal is transferred to ground potential via light guides connected between the optoelectric converter at the current transformer and an optoelectric converter, arranged at ground potential, which converts the optical signal into a shape and level adapted to the respective relay protection device. Although not shown in FIG. 3.1 in the cited document, the light guide from the respective current transformer is usually passed via a so-called platform link to a common joint box located on the platform, and from this all the light guides are then passed to ground potential via a common insulator in a so-called high-voltage link (FIG. 2.1 in the cited document).

Thus, the protective equipment comprises a large number of measuring points for current-measuring devices, and for each one of these there is required, in addition to the current transformer itself, a platform link for passing the respective light guide to the joint box. Each current-measuring device with its associated platform link entails, in addition to a material cost, also a cost for installation and commissioning. To this is added the fact that each component in an installation in principle increases the risk of a fault arising in the installation.

SUMMARY OF THE INVENTION

The object of the invention is to provide protective equipment for a series capacitor installation as well as a method for detecting abnormal operating conditions in a series capacitor installation, where the number of measuring points for current-measuring devices with associated platform links has been reduced.

It is a further object of the invention to provide a current-measuring device for forming a measured value representing the difference between the currents in a first and a second capacitor group in a series capacitor installation.

According to the invention, this is achieved by protective equipment of the kind mentioned in the introductory part of the description comprising means for forming a first measured value representing the difference between the first and the second capacitor current, and in that the respective protective measure is initiated in dependence on the first measured value.

In an advantageous further development of the invention, the above-mentioned means comprise a first current-measuring device for sensing the line current and forming a second measured value representing the line current, a second current-measuring device for sensing the second capacitor current and forming a third measured value representing the second capacitor current, and a calculating unit forming said first measured value in dependence on a difference of the second measured value and twice the third measured value.

In another advantageous further development of the invention, the means comprise a third current-measuring device for sensing the first and the second capacitor current and forming the first measured value in dependence on the difference between the first and the second capacitor current.

Further advantageous improvements of the invention will become clear from the following description and claims.

The invention achieves, among other things, the following advantages:
 the number of measuring points for current-measuring devices is reduced to two;
 platform links can be completely avoided since these measuring points may be arranged physically adjacent to each other; the light guide of the high-voltage link may be directly connected to the respective current-measuring device.

BRIEF DESCRIPTION OF THE DRAWINGS

The invention will be described in greater detail by description of embodiments with reference to the accompanying drawings, which are all schematic and-in the form of single-line diagrams and block diagrams, respectively, and wherein FIG. 2B shows a calculating unit for calculating a measured value representing the different between the currents in two parallel-connected capacitor groups in an embodiment of the invention according to FIG. 2A, and FIG. 3 shows an embodiment of relay protection equipment for a series capacitor installation according to the invention.

DESCRIPTION OF THE PREFERRED EMBODIMENTS

The following description relates to the protective equipment, the method for detecting abnormal operating conditions in the series capacitor installation, as well as the current-measuring device.

Figure 1:
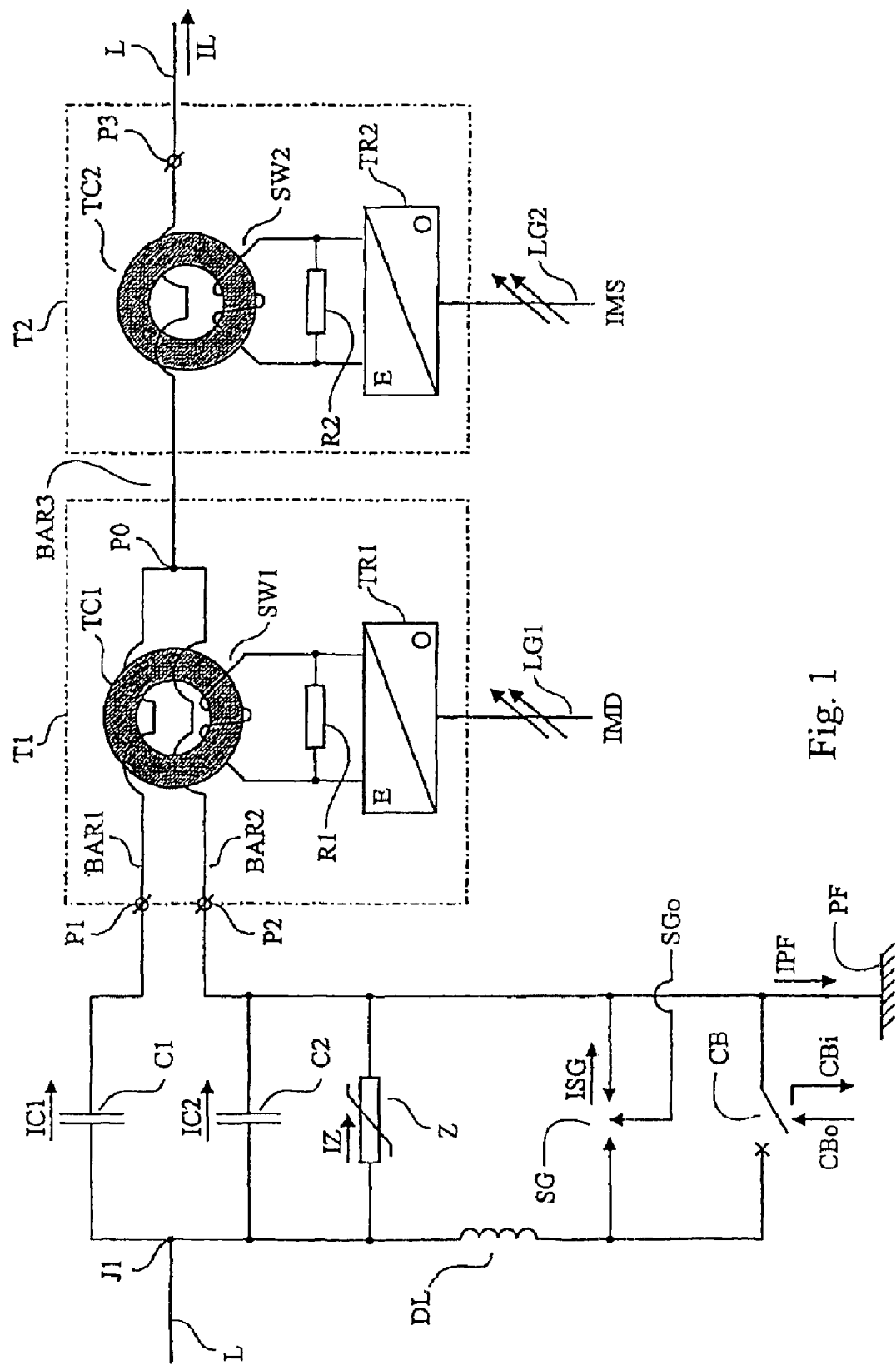
FIG. 1 shows a main circuit diagram for a series capacitor installation with current-measuring devices according to a first embodiment of the invention.

FIG. 1 shows a series capacitor installation with a series capacitor comprising a first capacitor group C1 and a second capacitor group C2. The installation, which is arranged on a platform PF (only schematically shown) insulated towards ground potential, further comprises a non-linear voltage-limiting resistor Z in the form of a varistor, a spark gap SG capable of being fired, a bypass breaker CB and a damping inductor DL.

One of the terminals on the respective capacitor group, on the varistor and on the damping inductor is connected to a connection point J1 and connected therein to a power line L. The other terminal on the damping inductor is connected to one of the terminals on the spark gap and on the bypass breaker. The other terminal on the spark gap and on the bypass breaker, on the varistor and on the capacitor group C2 is connected to a connection point P2, whereas the other terminal on the capacitor group C1 is connected to a connection point P1. The connection point P2 is connected to the platform via a galvanic connection.

The spark gap is fired in a manner known per se via a thyristorized firing device, not shown but arranged on the platform. The firing of the spark gap is initiated via a firing order SGo from relay protection equipment, arranged on ground potential, which will be described in more detail in the following. The bypass breaker is closed in dependence on a breaker order signal CBo generated by the relay protection equipment and the relevant breaker position is transferred thereto in the form of an indicating signal CBi. The firing order SGo is transferred via a light guide between ground potential and the platform whereas the mentioned order and indicating signals for the bypass breaker are usually transferred between the platform and ground level via a conventional control cable.

Through the capacitor group C1 a first capacitor current IC1 flows, and through the capacitor group C2 a second capacitor current IC2 flows, through the varistor a current IZ flows and through the spark gap, when fired, a current ISG flows.

At a flashover towards the platform, for example from the connection point J1, a current IPF flows through the mentioned connection between the connection point P2 and the platform.

According to the invention, a first measured value IMD is formed representing the difference between the first and the second capacitor current, whereby the respective protective measure is initiated in dependence on the first measured value.

According to a first embodiment of the invention, the first measured value is formed by means of a current-measuring device T1 shown in FIG. 1. The current-measuring device comprises a first measuring core TC1 with a secondary winding SW1, a burden in the form of a resistor R1, and an optoelectric converter TR1 of the kind described above. A first connection bar BAR1 is passed from the connection point P1 through the measuring core to a connection point P0 and a second connection bar BAR2 is passed from the connection point P2 through the measuring core to the connection point P0. If no or negligible currents flow through the varistor and through the spark gap, the capacitor currents IC1 and IC2 will thus flow through the measuring core to the connection point P0, that is, the capacitor groups C1 and C2 are connected in parallel between the connection point J1 and the connection point P0. As is schematically shown in the figure, the connection bars are passed through the measuring core in such directions that the capacitor currents IC1 and IC2 are conducted through the core with mutually opposite directions. The magnetic flux generated by the capacitor current IC1 in the measuring core thus counteracts the magnetic flux generated by the capacitor current IC2 in the measuring core, and the secondary winding thus generates a voltage representing the difference between the capacitor currents. This voltage is converted in the converter TR1 into an optical signal IMD, corresponding to the first measured value, which measured value on a light guide LG1 is transferred to and supplied to the relay protection equipment.

A current-measuring device T2 comprises a second measuring core TC2 with a secondary winding SW2, a burden in the form of a resistor R2, and an optoelectric converter TR2 of the kind described above. A third connection bar BAR3 is passed from the connection point P0 through the measuring core TC2 to a connection point P3, which connection point is also connected to the power line such that the series capacitor installation is connected in series in the power line. Still, if no or negligible currents flow through the varistor and through the spark gap, the capacitor currents IC1 and IC2, that is, under these conditions the line current IL, will thus flow through the measuring core TC2 to the connection point P3. The secondary winding SW2 thus generates a voltage representing the sum of the capacitor currents. This voltage is converted in the converter TR2 into an optical signal IMS, corresponding to a second measured value IMS which represents the line current, which measured value on a light guide LG2 is transferred to the relay protection equipment.

Figure 2A:
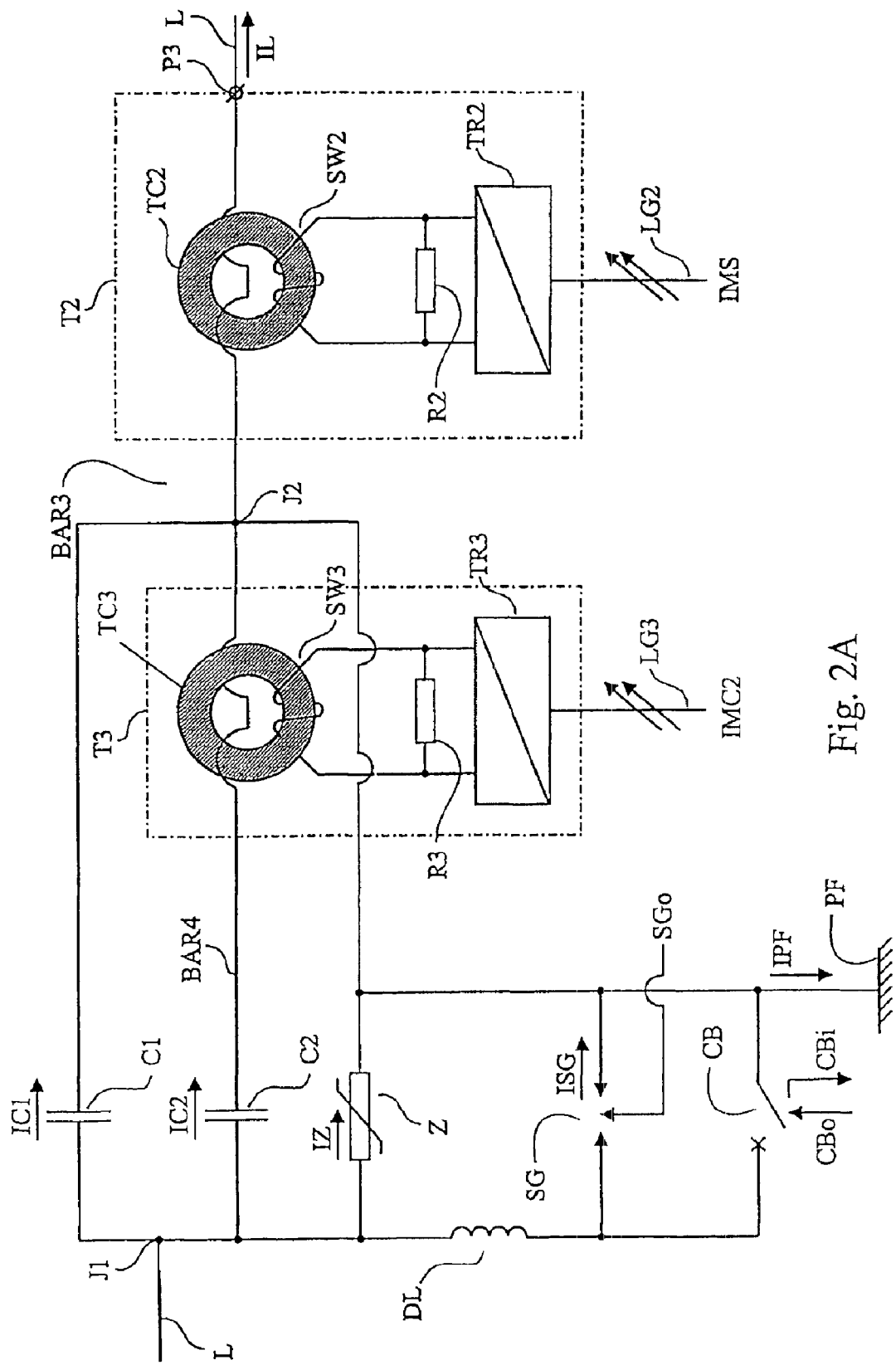
FIG. 2A shows a main circuit diagram for a series capacitor installation with current-measuring devices according to a second embodiment of the invention.

FIG. 2A shows a second embodiment of the invention where, in a manner to be describe below, the first measured value representing the difference between the first and second capacitor currents is formed in the relay protection equipment located at ground potential. In this embodiment of the invention, the first capacitor group C1, the second capacitor group C2 and the non-linear voltage-limiting resistor Z are mutually parallel-connected between the connection point J1 and a connection point J2.

The spark gap SG and the bypass breaker CB are mutually parallel-connected and connected in series with the damping inductor DL and the series circuit thus formed is, in its turn, connected between the connection points J1 and J2. Otherwise, these components are of the same kind as has been described with reference to FIG. 1. In this embodiment of the invention, the connection point J2 is connected to the platform via a galvanic connection.

A current-measuring device T3 comprises a third measuring core TC3 with a secondary winding SW3, a burden in the form of a resistor R3, and an optoelectric converter TR3 of the kind described above.

A connection bar BAR4 is passed from the capacitor group C2 through the measuring core to the connection point J2 such that the second capacitor current IC2 will flow through the measuring core. The secondary winding SW3 thus generates a voltage representing this capacitor current and this voltage is converted in the converter TR3 into an optical signal IMC2, corresponding to a third measured value IMC2 representing the second capacitor current IC2, which measured value on a light guide LG3 is transferred to the relay protection equipment.

Also in this embodiment of the invention, the protective equipment comprises a current-measuring device T2 of the same kind as described above with reference to FIG. 1. The connection bar BAR3 in this embodiment is passed from the connection point J2 through the measuring core TC2 to the connection point P3.

FIG. 2B shows a calculating unit 9, to which the second measured value IMS and the third measured value IMC2 are supplied. The calculating unit comprises a multiplying unit 91 for multiplication of the third measured value by a factor 2, and a difference-forming unit 92 for forming the difference of the second measured value and the third measured value multiplied by the factor 2. Since the output signal from the difference-forming unit 92 consists of a measured value of the difference of the sum current (that is, IC1+IC2) and twice the value of the second capacitor current (that is, 2*IC2), it is realized that this output signal represents the first measured value IMD.

FIG. 3 shows an embodiment of relay protection equipment for a series capacitor installation according to the invention. The relay protection equipment is supplied with the first measured value IMD which, as shown above, is formed either according to the embodiment of the invention described with reference to the FIG. 1 or, alternatively, according to the embodiment of the invention described with reference to FIGS. 2A and 2B.

The relay protection equipment comprises, in a manner known per se, a relay protection device 1 of inverse-time type to protect the series capacitor against thermal overload, a relay protection device 2 for detecting subsynchronous oscillations in the current flowing through the power line, a relay protection device 3 for monitoring the line current and blocking reclosing of the series capacitor installation, a relay protection device 4 for detecting unbalance in the series capacitor, and a relay protection device 5 for protecting the varistor against overcurrent and thermal overload.

In addition thereto, the relay protection equipment comprises a relay protection device 6 for common detection of short-circuit faults in the series capacitor installation, such as, for example, any remaining current through the spark gap, flashover towards the platform, and short-circuit faults in the varistor. Detection of the three mentioned kinds of abnormal conditions, in the following summarily designated main-circuit faults, in one single combined relay protection device is made possible in that the first measured value, formed according to the invention, gives an indication of all of these abnormal conditions.

In dependence on a detected abnormal condition, each one of the relay protection devices 1–2 and 4–6 initiates a protective measure for the installation by generating the breaker order signal CBo. The breaker order signal is supplied to an OR circuit 7, which forwards the signal to the operating device (not shown in FIGS. 1 and 2A) of the bypass breaker which, in dependence on the order signal, closes the breaker.

The indicating signal CBi indicating that the bypass breaker is in the closed position (FIGS. 1 and 2A), the firing order SGo for the spark gap, and the breaker order signal CBo are supplied to an OR circuit 8 (FIG. 3). The breaker order signal is delayed in a delay unit 81 by a time substantially corresponding to the operating time of the bypass breaker for closing, typically of the order of magnitude of 50 ms. The output signal BPblock from the OR circuit 8 is supplied to the relay protection devices 4–6 to block these when a controlled closing—that is, not initiated by the protective equipment—of the bypass breaker or firing of the spark gap.

According to the invention, the first measured value IMD, representing the difference between the first and the second capacitor current, is supplied to the relay protection device 4 to indicate an unbalance in the series capacitor. For practical reasons, the difference-voltage measured value is low-pass filtered in a low-pass filtering member 4F before being supplied to the relay protection device In addition, the relay protection device 4 is usually supplied with the second measured value IMS, representing the line current, whereby a quotient between the first and second measured values is utilized for indicating the condition of the capacitor units.

Further, according to the invention, the first measured value is supplied to the relay protection device 5 to indicate overcurrent and thermal overload in the varistor. As is clear from FIGS. 1, 2A and 2B, the first measured value constitutes a measured value of the current IZ through the varistor on condition that the difference between the capacitor currents IC1 and IC2 may be neglected. In addition to the breaker order signal CBo, this relay protection device also forms a firing-order signal SGo for firing the spark gap. To avoid that discharge currents through the spark gap influence the relay protection device, the first measured value is low-pass filtered in a low-pass filtering member 5F before being supplied to the relay protection device. It is advantageous if the relay protection device is not activated until the second measured value exceeds a level corresponding to a voltage where the varistor starts carrying current and is, for this purpose, also supplied with the second measured value. This is indicated in FIG. 3 by supplying the second measured value IMS to the relay protection device 5. The second measured value, which thus represents the line current, may also be used for determining loss power and operating temperature for the varistor under normal operating conditions.

Further, according to the invention, the first measured value is supplied to the relay protection device 6 to indicate a main-circuit fault. Characteristic of these types of fault is that they cause a discharge current of the capacitor groups through the site of the fault. In the embodiment described with reference to FIG. 1, the discharge current from the capacitor group C2 will not pass any current-measuring device whereas the discharge current from the capacitor group C1, that is, essentially half of the total discharge current, will pass through the measuring core TC1 between the connection points P1 and P2 via the connection point P0. In this way, the measured value IMD constitutes an at least approximate measured value of the total discharge current.

It is also realized that in the embodiment described with reference to FIGS. 2A and 2B, the first measured value constitutes an at least approximate measured value of the total discharge current.

The frequency contents of the discharge current depends on whether it flows through the damping inductor DL or not. A short-circuit fault in the varistor or a flashover from the connection point J1 towards the platform thus leads to a discharge current which exhibits an undamped oscillation with a frequency content of typically 3–5 kHz, whereas a firing of the spark gap leads to a discharge current, which thus flows through the damping inductor, which exhibits a damped oscillation with a frequency content of typically 1 kHz. To obtain a safer detection of these faults, the first measured value IMD is therefore high-pass filtered in a high-pass filtering member 6F before being supplied to the relay protection device. In addition to the breaker-order signal CBo, the relay protection device 6 also forms a non-time-delayed output signal MCFblock to block the relay protection devices 4–5 in the event of an indicated main-circuit fault.

The invention is not limited to the embodiments shown but a plurality of modifications are feasible for the invention defined by the claims. Thus, for example, in the embodiment of the invention described with reference to FIG. 1, the current transformers T1 and T2 may be designed as one physical unit. It is, of course, also possible to form the first measured value by using conventional current transformers, the secondary windings of which are connected to a separately enclosed optoelectric converter or by using conventional fully insulated current transformers. The calculating unit described with reference to FIG. 3A may advantageously constitute an integrated part of the relay protection device.

What is claimed is:

1. Protective equipment for a series capacitor installation, the installation being operative to be arranged on a platform, insulated towards ground, for connection into a power line for carrying a line current, the protective equipment comprising:
    a first capacitor group operative to carry a first capacitor current;
    a second capacitor group operative to carry a second capacitor current and arranged in parallel with the first capacitor group;
    a non-linear voltage-limiting resistor connected in parallel with the first capacitor group and the second capacitor group;
    means for forming a first measured value representing a difference between a first capacitor current and a second capacitor current; and
    means operative, in dependence on the first measured value, to initiate a protective measure for the series capacitor installation for each abnormal operating condition,
    wherein the protective equipment is operative, in dependence on currents sensed in the series capacitor installation and on chosen criteria for evaluation thereof, to initiate a protective measure for the installation in case of the abnormal operating condition.

2. The protective equipment according to claim 1, wherein the abnormal condition is selected from the group consisting of unbalance between the first and second capacitor currents, overcurrent through the voltage-limiting resistor, and short-circuit faults in the series capacitor installation.

3. Protective equipment for a series capacitor installation, the installation operative to be arranged on a platform, insulated towards ground, for connection into a power line for carrying a line current, the protective equipment comprising:
- a first capacitor group operative to carry a first capacitor current;
- a second capacitor group operative to carry a second capacitor current and arranged in parallel with the first capacitor group;
- a non-linear voltage-limiting resistor connected in parallel with the first capacitor group and the second capacitor group;
- forming means for forming a first measured value representing a difference between a first capacitor current and a second capacitor current, the forming means comprising a first current-measuring device operative to sense the line current and to form a second measured value representing the line current, a second current-measuring device to sense the second capacitor current and to form a third measured value representing the second capacitor current, and a calculating unit operative to form the first measured value in dependence on a difference between the second measured value and twice the third measured value; and
- protection means operative, in dependence on the first measured value, to initiate a protective measure for the series capacitor installation for an abnormal operating condition,
- wherein the protective equipment is operative, in dependence on currents sensed in the series capacitor installation and on chosen criteria for evaluation thereof, to initiate a protective measure for the installation in case of an abnormal operating condition.

4. The protective equipment according to claim 3, wherein the abnormal condition is selected from the group consisting of unbalance between the first and second capacitor currents, overcurrent through the voltage-limiting resistor, and short-circuit faults in the series capacitor installation.

5. The protective equipment according to claim 3, wherein the forming means further comprises a third current-measuring device operative to sense the first capacitor current and the second capacitor current and to form the first measured value in dependence on the difference between the first capacitor current and the second capacitor current.

6. The protective equipment according to claim 5, wherein the third current-measuring device comprises a magnetic core operative to commonly sense both the first capacitor current and the second capacitor current, whereby the first capacitor current and the second capacitor current are conducted through the magnetic core in opposite directions.

7. The protective equipment according to claim 5, further comprising:
- a first current-measuring device operative to form a second measured value representing the line current.

8. The protective equipment according to claim 3, wherein at least under the abnormal operating condition that includes an unbalanced current between the first capacitor current and the second capacitor current, a protective measure is initiated in dependence on a quotient of the first measured value and the second measured value.

9. A method for protecting a series capacitor installation arranged on a platform insulated towards ground and connected to a power line carrying a line current, the series capacitor installation comprising a first capacitor group operative to carry a first capacitor current, a second capacitor group operative to carry a second capacitor current and arranged in parallel with the first capacitor group, and a non-linear voltage-limiting resistor connected in parallel with the first capacitor group and the second capacitor group, wherein, depending upon currents sensed in the installation and upon chosen criteria for evaluation thereof, a protective measure for the installation is initiated in case of an abnormal operating condition, the method comprising:
- forming a first measured value, representing a difference between the first capacitor current and the second capacitor current; and
- initiating a protective measure for the installation in dependence on the first measured value, wherein the protective measure is initiated for the abnormal operating condition.

10. The method according to claim 9, wherein the abnormal condition is selected from the group consisting of unbalance between the first and second capacitor currents, overcurrent through the voltage-limiting resistor, and short-circuit faults in the series capacitor installation.

11. The method according to claim 9, wherein the first measured value is formed by conducting the first capacitor current and the second capacitor current through a magnetic core in opposite directions.

12. The method according to claim 11, further comprising:
- forming a second measured value representing the line current.

13. The method according to claim 12, wherein at least under the abnormal operating condition that includes an unbalanced current between the first capacitor current and the second capacitor current, the protective measure is initiated in dependence on a quotient of the first measured value and the second measured value.

14. A method for protecting a series capacitor installation arranged on a platform insulated towards ground and connected to a power line carrying a line current, the series capacitor installation comprising a first capacitor group operative to carry a first capacitor current, a second capacitor group operative to carry a second capacitor current and arranged in parallel with the first capacitor group, and a non-linear voltage-limiting resistor connected in parallel with the first capacitor group and the second capacitor group, wherein, depending upon currents sensed in the installation and upon chosen criteria for evaluation thereof, a protective measure for the installation is initiated in case of an abnormal operating condition, the method comprising:
- forming a first measured value, representing a difference between the first capacitor current and the second capacitor current;
- forming a second measured value representing the line current;
- forming a third measured value representing the second capacitor current, wherein the first measured value is formed in dependence on a difference of the second measured value and twice the third measured value; and
- initiating a protective measure for the installation in dependence on the first measured value, wherein the protective measure is initiated for the abnormal operating condition.

15. The method according to claim 14, wherein the abnormal condition is selected from the group consisting of unbalance between the first and second capacitor currents, overcurrent through the voltage-limiting resistor, and short-circuit faults in the series capacitor installation.

16. The method according to claim 14, wherein the first measured value is formed by conducting the first capacitor current and the second capacitor current through a magnetic core in opposite directions.

17. The method according to claim 14, wherein at least under the abnormal operating condition including unbalanced current between the first capacitor current and the second capacitor current, the protective measure is initiated in dependence on a quotient of the first measured value and the second measured value.

18. A current-measuring device, in a series capacitor installation operative to be placed on a platform, insulated towards ground, for connection into a power line for carrying a line current, the series capacitor installation comprising a first capacitor group for carrying a first capacitor current and a second capacitor group for carrying a second capacitor current, the first capacitor group and the second capacitor group being mutually parallel-connected, the device forming a first measured value representing the difference between the first capacitor current and the second capacitor current, the device comprising:

- a first terminal for connection to the first capacitor group;
- a second terminal for connection to the second capacitor group;
- a third terminal for connection to the power line;
- a connection point;
- a first measuring conductor extending between the first terminal and the connection point;
- a second measuring conductor extending between the second terminal and the connection point;
- a third measuring conductor extending between the third terminal and the connection point; and
- a first magnetic core surrounding the first and second measuring conductors such that a current flowing from the first terminal to the connection point and a current flowing from the second terminal to the connection point form magnetic fluxes in the core which are mutually oppositely directed.

19. The current-measuring device according to claim 18, further comprising:

- a second magnetic core surrounding the third measuring conductor for forming a second measured value representing the line current.

20. The current-measuring device according to claim 18, further comprising:

- an electro-optic converter operative to convert the first measured value into an optical signal for transmission to ground potential via a light guide.

* * * * *